United States Patent [19]
Hoffman

[11] Patent Number: 6,157,916
[45] Date of Patent: Dec. 5, 2000

[54] METHOD AND APPARATUS TO CONTROL THE OPERATING SPEED OF A PAPERMAKING FACILITY

[75] Inventor: Roger Paul Hoffman, Green Bay, Wis.

[73] Assignee: The Hoffman Group, Green Bay, Wis.

[21] Appl. No.: 09/098,811

[22] Filed: Jun. 17, 1998

[51] Int. Cl.[7] .................................................. G06F 17/60
[52] U.S. Cl. .............................. 705/8; 702/182; 702/188; 705/1; 705/7; 705/11
[58] Field of Search .............................. 364/148.01, 152, 364/156, 166, 468.15, 471.01, 471.02; 702/182, 188; 705/1, 7, 8, 9, 11, 400

[56] References Cited

U.S. PATENT DOCUMENTS

| | | | |
|---|---|---|---|
| 3,490,689 | 1/1970 | Hart et al. | 364/156 |
| 3,536,258 | 10/1970 | Rocheleau | 702/175 |
| 3,582,621 | 6/1971 | Lawler | 364/138 |
| 3,602,701 | 8/1971 | Boyd, Jr. . | |
| 4,107,883 | 8/1978 | Bein | 451/14 |
| 4,176,535 | 12/1979 | Elsner et al. | 72/8.3 |
| 4,206,793 | 6/1980 | Kipp | 144/365 |
| 4,346,446 | 8/1982 | Erbstein et al. | 702/182 |
| 4,368,509 | 1/1983 | Li | 364/148.08 |
| 4,442,710 | 4/1984 | Meng | 73/152.31 |
| 4,517,637 | 5/1985 | Cassell | 364/138 |
| 4,704,805 | 11/1987 | Kaya et al. | 34/483 |
| 4,866,628 | 9/1989 | Natarajan | 364/468.08 |
| 4,887,206 | 12/1989 | Natarajan | 705/29 |
| 5,034,897 | 7/1991 | Sainen | 700/140 |
| 5,249,120 | 9/1993 | Foley | 705/1 |
| 5,383,129 | 1/1995 | Farrell | 705/400 |
| 5,442,561 | 8/1995 | Yoshizawa et al. | 364/468.06 |
| 5,758,329 | 5/1998 | Wojcik et al. . | |
| 5,893,082 | 4/1999 | McCormick | 705/400 |

FOREIGN PATENT DOCUMENTS

| | | |
|---|---|---|
| 19821301 A1 | 11/1999 | Germany . |
| WO 99/66439 | 12/1999 | WIPO . |

OTHER PUBLICATIONS

Keys et al: "Optimum supervisory control of paper basis weight and machine speed by statisical methods"; Proceedings of the 1990 American Control Conference (IEEE cat. no. 90CH2896–9) vol. 3, pp. 2715–2720.

Keys et al: "A novel method of optimum superivsory control of basis weight and machine speed in paper production"; SICE '89 Proceedings of the 28th SICE Annual Conference, vol. II (cat no. 89TH0298–0) pp. 1179–1182.

Roger Yeager, Information boosts personal performance at Blandin Paper, Pima's Papermaker, Apr. 1998, pp. 54–58, Mount Prospect, IL, USA.

Primary Examiner—Edward R. Cosimano
Attorney, Agent, or Firm—Weiss & Weiss; Philip M. Weiss, Esq.

[57] ABSTRACT

A method and apparatus for controlling the operating speed of a papermaking facility is disclosed. It includes determining a desired operating speed that is dependent on at least one economic variable. The variables vary with the operating speed. Also, the operating speed is adjusted (if necessary) in response to the determination. Preferably the control is closed loop and includes determining a current operating speed and comparing the current operating speed to the desired operating speed. The operating speed is controlled in response to the comparison. The economic variable is preferably a cost of manufacturing, and/or manufacturing inflows, and/or manufacturing outflows. Also, a method and apparatus that determines the effect of one or more business transactions on the economic efficiency of the production of products in a paper manufacturing facility is disclosed. The economic efficiency is dependant on one or more economic variables that vary with operating speed. The current economic efficiency of the facility is obtained along with information on the business transactions that affects the economic variables. The economic efficiency of the facility with the proposed transaction, leaving the remaining variables constant is calculated. Then, the result is displayed to the end user.

39 Claims, 3 Drawing Sheets

METHOD AND APPARATUS TO CONTROL THE OPERATING SPEED OF A PAPERMAKING FACILITY

FIELD OF THE INVENTION

The present invention relates generally to the control of machinery, and more particularly controlling operating speed of equipment in a paper manufacturing facility.

BACKGROUND OF THE INVENTION

Current control systems of the machinery and processes of a facility in the papermaking industry generally run equipment and processes as fast as possible, while maintaining a set level of quality. The focus of control is on the current and historical operating characteristics of the particular piece of equipment, with a particular emphasis on output quality. The controls are sometimes designed to maintain maximum operating speed and the operator manually assesses and controls operations to maintain a targeted acceptable quality. Conversely, the controls may be designed to assess the operation of the equipment to assure that it is maintaining an acceptable quality of product while the operator forces the equipment to higher levels of production. In either case, the assumptions that faster is better (if quality is acceptable), underlies the prior art control systems. This is a faulty assumption: faster might actually be less desirable.

Controls are, therefore, designed to monitor, assess and aid in improvement of the quantitative and qualitative efficiency of the particular piece of equipment. For example, certain paper scanning devices are used on the finished end of a paper machine to determine if the paper product has adequate levels of dryness and basic uniformity. If these measurements detect a trend in the finished product towards unacceptable quality, the machine speed or other items may be automatically or manually adjusted (usually downward) to assure that adequate product quality is obtained. Similarly, the machine control system or operator personnel will monitor the amount of sheet breaks or excessive poor quality that occur on the machine. Again, speed or other items may be adjusted (usually downward) on the machine to reduce the number of breaks to assure that productive efficiency is achieved. Alternatively, if quality and the number of breaks are acceptable, the speed may be adjusted upward.

Production adjustments based on sheet breaks or subsequent roll quality problems discovered downstream are, however, predominately performed manually by operators who informally estimate whether the number of paper breaks or the quality deterioration is severe enough to merit adjustments, such as a reduction of machine speed. There are, in other words, no automated control systems that currently control the operating speed in response to productive efficiency of a paper machine.

An evaluation of the production efficiency is dependent on several variables and, therefore, an operator does not have all the necessary information to determine the ideal target operating speed. Thus, all adjustments based on efficiency are merely estimates to hopefully target ideal operating speed, even for the most experienced operators. Consequently, the operator unknowingly selects an operating speed based on a few obvious variables relating to inefficiencies. This selected speed may be, however, considerably far from the optimal operating speed. Further, changes to the operations that effect efficiency can occur rapidly, while manual reactions base on operator observations typically lag considerably behind. This lack of complete information and timely reaction greatly reduces the efficiency of the equipment operation.

While operating speed of a paper machine may be adjusted directly by control of the paper machine drive, it is often adjusted by changes to the steam pressure for the paper machine dryers. For example, when production is to be decreased, either manual input or machine controls first decrease the steam pressure in the dryer cans, which in turn increase the moisture content of the paper. As the moisture content increases, the machine's paper measuring system senses the moisture increase in the finished paper and automatically decreases the machine speed to allow for greater drying time. This, of course, has the same effect as decreasing the machine speed directly by slowing the paper machine drive motors. This is typical of many automatic adjustments to operating speed, which are affected by a forced change in quality, such as increased moisture content.

While unacceptable quality and sheet breaks occur at all acceptable paper machine operating speeds, increased frequency of breaks and diminishment of quality occurs as the operating speed increases. Current automated machine controls do not maximize efficiency by taking into account the loss of unacceptable quality and sheet breaks for determining the appropriate operating speed of a paper machine. Aside from providing information on sheet quality and sheet breaks, current machine and information system controls do not aid in the adjustment of the machine production to achieve the most efficient or optimal operating speed.

Similar situations occur through out a papermaking facility. Another example, for instance, is the control systems on a wood pulp digester. Pulp mill operators utilize current control equipment that measures, among other characteristics, the kappa number of pulp leaving the digester to determine an acceptable operating speed. As the production reaches or exceeds the digester's designed capacity, the kappa number increases. The pulp mill operators will set a limit on an acceptable higher-than-ideal limit on the Kappa number. This upper limit is established by understanding that additional delignification will occur in the subsequent bleaching process. While the higher limit may be established on a criteria that factors in an estimate of bleaching costs, the pulp mill control system does not actually calculate the cost of additional bleaching. There are no control features presently available that limit the digester operation speed based on the actual current marginal cost of the additional bleaching. Rather, pulp mill operators estimate the bleaching cost based on an average cost.

For example, it may be determined that the average additional bleaching activity required to achieve a certain level of additional delignification will cost $20 per ton of pulp, based on an average cost of bleaching. A pulp mill operator may, therefore, allow the digester to operate at a level that exceeds its capacity because such operation is considered efficient if the additional bleaching costs are actually $20 per ton. When all variables are considered, however, it may be discovered that the additional bleaching action required on a certain level of marginal operating speed may be measured to actually reach $100 per ton due to the non-proportional demands for bleaching chemicals, energy, and effluent treatment. Current controls do not calculate from the necessary variables the total additional bleaching cost on the marginal operating speed, and subsequently limit digester operations to not incur the additional inefficient bleaching.

Current equipment controls are utilized by paper manufacturing operators to control certain immediate inventories of items that are directly used by the equipment being controlled. For example, paper machine operating speed may be decreased manually or automatically by machine controls as high-density storage pulp inventory in front of the paper machine is decreased. When the machine controls recognizes an inventory depletion of pulp from high density storage, machine speed or steam pressure to the dryers may be limited to decrease machine operating speed to allow pulp storage to replenish or "catch-up" to desired levels of operation. This control of machine operating speed is, however, based solely on assuring adequate quantity of materials for continued operation, rather than any measure of operating speed based on efficiency.

One problem with current control systems is that they are strictly focused on either one particular piece of equipment's operating characteristics, or at best, focus on monitoring the availability of inflow materials for the piece of equipment. For example, the machine controls for a paper machine monitors the operating characteristics of the machine itself, primarily in the area of quality of the finished product. As discussed above, the controls may also monitor pulp inventory in high-density storage to help assure that inflows are available for continued operation. Current controls do not, however, monitor many, or even most, manufacturing inflows from the time of introduction into the process. For example, the availability of wood through recent purchases and all intervening steps throughout production from wood to pulp held in high density storage for the machine should be factored into the appropriate optimal operating speed of a paper machine. Similarly, a digester operating speed should be determined with a focus on the current efficiency of the bleach plant, based on its operating characteristics, to arrive at an efficient operating speed.

The current control systems also do not factor in many, or even most, events that occur with the product after it leaves the particular piece of equipment. For example, current controls of paper machines do not factor in the many activities that occur after the paper leaves the machine. Machine operating speeds are not, for example, tied to the finishing, inventorying and selling processes that occur after the paper leaves the paper machine. These activities should, however, have a significant effect on the operating speed of the machine, as the efficiency of the entire manufacturing process is relevant to any one component's operating speed.

To maximize operating efficiencies by optimizing the operating speed, control systems should link the entire manufacturing process activities together to analyze all, or as many as useful, potential variables. For a papermaking facility, these activities include the purchase of raw materials and the sales of finished goods. For example, the activity of procuring wood in the forest and the selling of finished product should be factored into the operating speed control of the paper machine and all other equipment.

An additional problem with current control systems is that any measured efficiency on marginal operating speed is based solely on quantitative and qualitative measurements, rather than total economic efficiency. While the quantitative and qualitative measurements are used to improve the economics of the concern, they do not include one other essential component of total economic efficiency, which is price.

In making equipment operating speed decisions, the current control systems fails to account for the price component of the economic efficiency of a particular activity. While productive and qualitative measurements of equipment operations are essential to establishing an appropriate efficient operating speed, the individual price components of input materials, processing or manufacturing, and value of outputs should also be factored into calculating the efficient operating speed of equipment. For example, under the current control system, additional steam showers may be added to the papermarking process on a paper machine to increase the operating speed. Current controls systems would dictate operating at the increased rate, without factoring the incremental use of the additional steam.

While the paper industry is the focus of the above examples, many additional industries have similar limitations in their current equipment control systems. These industries are similarly suffering from inefficiencies due to inadequate integrated control systems that factor in marginal operating speeds.

SUMMARY OF THE PRESENT INVENTION

According to a first aspect of the invention a method of controlling, and apparatus, which can include a computer program, that controls, the operating speed of a papermaking facility includes determining a desired operating speed. The desired operating speed is dependent on at least one economic variable that varies depending on the operating speed. Also, the operating speed is adjusted (if necessary) in response to the determination.

One embodiment also includes determining a current operating speed of the papermaking facility, and comparing the current operating speed to the desired operating speed. The operating speed is controlled in response to the comparison.

Another embodiment includes determining the desired speed where the economic variable is a cost of manufacturing, and/or manufacturing inflows, and/or manufacturing outflows.

The desired operating speed is determined by calculating the cost of manufacturing, the manufacturing inflow, and the manufacturing outflow at a plurality of potential operating speeds. Then the desired operating speed is selected from the potential operating speeds, in an alternative. The desired operating speed is determined by calculating a marginal cost of manufacturing, a marginal manufacturing inflow, and a marginal manufacturing outflow at a plurality of marginal potential operating speeds in another alternative. The desired operating speed is selected from the marginal potential operating speeds and a prior desired operating speed.

The economic variable is cost of manufacturing, and the cost of manufacturing includes ascertaining the correlation between operating speed and the cost of manufacturing, in yet another embodiment. The cost of manufacturing may be determined by ascertaining a correlation between operating speed and the per-unit cost of manufacturing inflows and/or the usage of manufacturing inflows. Also, the correlation between manufacturing cost and operating speed may be ascertained by establishing the correlation between manufacturing costs and operating speed of specific equipment or process in a paper manufacturing facility. In another alternative the correlation between manufacturing cost and the operating speed of a paper machine includes the manufacturing inflows during sheet breaks and/or while the facility is producing finished product of unacceptable quality.

Another alternative provides that the correlation between manufacturing cost and operating speed is ascertained by establishing the correlation between manufacturing costs and the operating speed of groups of equipment or processes in a paper manufacturing facility. Also, the purchase price of manufacturing inflows may be assigned, from lowest to highest per-unit cost, to increasing levels of the paper manufacturing facility's production.

Yet another alternative provides that the manufacturing outflow is determined by ascertaining a correlation between operating speed and sales of at least one of finished products and byproducts. The correlation between the operating speed and sales may be ascertained by assigning a plurality of manufacturing outflows to at least one specific portion of the paper manufacturing facility's production. Alternatively, the correlation between operating speed and sales may include variations in product mix. The manufacturing outflow is determined, from highest to lowest per-unit economic value, for increasing levels of the paper manufacturing facility's production, in one embodiment.

A second aspect of the invention is a method and apparatus that determines the effect of one or more business transactions on the economic efficiency of the production of products in a paper manufacturing facility. The economic efficiency is dependent on one or more economic variables that vary with operating speed. It includes obtaining the current economic efficiency of the facility and inputting information on the business transactions that affects the economic variables. Also, the economic efficiency of the facility with the proposed transaction leaving the remaining variables constant is calculated. Then, the result is displayed to the end user.

In one embodiment the operating speed of the paper manufacturing facility is dependent on at least one economic variable that varies depending on the operating speed. In another embodiment, the transactions include one or more of purchase of inflows, sales of outflows, capital additions, capital subtractions, changes to equipment, change in product mix. In a third alternative the business transactions are proposed business transactions.

Other principal features and advantages of the invention will become apparent to those skilled in the art upon review of the following drawings, the detailed description and the appended claims.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

The present invention is, in one embodiment, a method and apparatus for an integrated control system in a manufacturing facility, or computer program implementing the system, that establishes and implements an optimal operating speed for equipment or processes that enhances the efficiency of the entire activity involved in a manufacturing facility. While the invention could be utilized in a number of manufacturing businesses, such as steel (and the production of other metals), petroleum and energy, the description primarily focuses on manufacturing facilities in the paper industry. The use of a papermaking facility example throughout the description is not meant, however, to limit the scope of the invention to the paper industry. It is used to illustrate the applicability of the invention to a particular industry that will greatly benefit from its use. The applicability of this control system to other industries will become apparent through the summary and description of the invention.

The use of the term papermaking or paper manufacturing facility in this application shall include any manufacturing plant, any single piece of equipment or process, or groups of equipment or processes that includes a manufacturing activity for the manufacture of pulp (including pulp to be sold to outside customers), paper, or any paper converting operation. The use of the term also could include groups of facilities, particular product lines in a paper manufacturing company or the entire company itself. The control system, therefore, could encompass more than a single manufacturing plant but rather could be integrated throughout all the plants of an entire company. For example, the operating speed of a paper machine in facility A of a paper manufacturing company could be interrelated to the optimal operating speed of a paper machine in facility B or interrelated to a paper converting operation.

The present invention, as it relates to the paper industry, is a method of controlling the operating speed of equipment or processes in a papermaking facility by computing and implementing an optimal operating speed for the equipment throughout the entire facility. The computed optimal operating speed is dependent on variables that are correlated with operating speed. The invention includes, in various embodiments, the software used to compute the optimal operating speed, the hardware that implements the control, and the method used in determining the optimal operating speed.

Operating or production speed is defined as the output, measured in any applicable units (such as tonnes per day for a pulp washer, cords per hour for debarking equipment or feet per second for a paper machine): of particular pieces of equipment (such as a paper machine or a digester), of particular processes (such as a bleaching operation), or of the entire facility. Operating speed may be expressed as a percentage of maximum speed or as the fraction of actual operating time over the total possible time of operation. It may also be reflected as a fraction of output (measured in any applicable units) over the total maximum output. Facility operating speed is the operating speed of a facility, including: one or more plants, one or more product lines of a company, and one or more pieces of equipment or process.

The variables that are dependant on the operating speed can include: the variable usage of manufacturing inflows, the variable cost of manufacturing inflows and the variable economic value of manufacturing outflows.

Manufacturing inflows include raw materials and/or other manufacturing supplies that are utilized in the manufacturing process that has either per-unit cost or usage that varies with operating speed. For a pulp and paper manufacturing facility, these may include, but are not limited to, pulpwood, wood chips, secondary or post-consumer recyclable fiber, purchased virgin pulp, purchased secondary or post consumer pulp, water, pulping chemicals, bleaching chemicals, paper additive chemicals, electricity, fossil fuels of any type, purchased steam, paper machine felts, paper machine wires, labor costs (to the extent that it varies with production speed), effluent treatment chemicals and paper finishing chemicals (such as coating and sizing ingredients). Costs for outside services that substitute for activities within the facility should also be included as manufacturing inflows if they vary with Operating Speed. For example, payments to municipalities to handle excess effluent treatment are in lieu of the chemical, energy and other supply purchases that are associated with in-facility effluent treatment, and therefore, should be considered as a manufacturing inflow.

The variable usage of manufacturing inflows (or sometimes referred to as manufacturing inflows), is established at different paper machine operating speeds by computing the effect of operating speed on the usage of manufacturing inflows.

To compute the variable usage of manufacturing inflows at various operating speeds for the entire facility, the inventive control system aggregates the variable usage of manufacturing inflows for the separate pieces of equipment or process in the facility. While it is not likely, practical or relevant to include every piece of equipment in a facility for this purpose, each facility operator will be able to use the inventive control system by selecting which equipment to include in the control process. Further, each facility operator can aggregate the results of separate equipment or process usage into grouping of equipment or processes.

The information on variable usage of manufacturing inflows could be obtained, either manually or electronically, from other control or information systems in the mill that could provide historical data to create a formula or other computation mechanism to establish the usage at different operating speeds. This information could also be obtained through physical observation by facility personnel or through feedback systems designed solely to work with this inventive control system.

To effectively measure total efficiency, the inventive control system will convert the variable usage of manufacturing inflows to dollar amounts based on manufacturing inflow costs. These costs are inputs of the inventive control system, to generate a variable cost of manufacturing inflows. The inputs on costs could be performed manually or through other information systems within the facility.

Finished goods and sellable byproducts, which are referred to as manufacturing outflows, can also have a value assigned to help establish the optimal operating speed of equipment based on economic efficiency. These values can vary based on the operating speed of the equipment. This is referred to as the variable economic value of manufacturing outflows. The value assigned could be the net sales price of finished goods. These prices could be input into the inventive control system manually or electronically through other information systems within the facility. They could also be input through physical observation or by feedback systems designed solely to work with this inventive control system.

While the optimal operating speed may be defined in many different ways by a facility operator implementing this invention, in the preferred embodiment it is the operating speed of the entire facility, or part of the facility, that provides the greatest efficiency to the facility. The optimal operating speed of any particular piece of equipment or process may not be its own most efficient or optimal speed, since the optimal operating speed may be measured on the basis of integration of all relevant equipment and processes in a facility. In other words, the equipment may be limited in reaching its own most effective operating speed, if its contribution to the overall efficiency of the facility can be enhanced by operation at a greater or less speed.

The optimal operating or production speed may focus on the operating speed of a particular piece of focal point machinery from which other equipments' operating speed could be established. For purposes of effectively controlling and measuring the speed that achieves the greatest overall efficiency of a facility. A paper machine, for example, would be a logical choice for a focal piece of equipment. This choice allows other equipment or processes to establish their required operating speed based on the requirements of the process flows for the paper machine (these process flows include manufacturing activities that occur before and after the paper machine). The focal point may first be on the combined operating speed of all the paper machines before segregating the speeds to the separate machines for multi-machine facilities. The term paper machine in the singular discussed herein, therefore, also includes the plural.

The optimal operating speed, in terms of economic efficiency, can be defined as the operating speed that provides the highest amount of positive difference between the facility value of manufacturing outflows and the cost of manufacturing.

Manual or automatic adjustments of the operating speed of a particular piece of equipment or process is made after the inventive control system computes the optimal operating speed. The inventive control system computes a revised optimal operating speed as variables in the process change, such as changes in variable usage or costs of manufacturing inflows, either instantaneously or at a later time. The inventive control system will then be used to either initiate manual or automatic adjustments to the operating speed of the equipment to achieve the new optimal operating speed.

Like other control systems, the inventive control system can also provide ancillary data that will be useful for operations. For example, it can provide information on the effect of deviations from the optimal operating speed. If equipment is not performing at the designated optimal operating speed, the inventive control system could compute and provide information on the deviation's effect on the efficiency (economic or otherwise) of the facility.

The inventive control system will also provide useful ancillary information for activities outside of the controlled environment, such as purchasing and selling decisions in the paper manufacturing business. For example, the wood procurement department would be able to access information from the inventive control system to understand the impact that a proposed or accepted wood purchase decision would have on the economic efficiency of the operation.

Another potential source of ancillary information would be the effect that capital improvements, additions or deletions have on the speed and efficiency of an operation. For example, the inventive control system can provide useful information on the effect that a new paper machine, other piece of equipment, or change in process would have on the optimal operating speed of the equipment in the facility.

Generally, the inventive control system may be implemented using a closed-loop control, where feedback indicating the actual speed is used to adjust the speed, or implemented using an open-loop control. An example of a possible embodiment of the control system invention is described in more detail with the use of the accompanying drawings.

Figure 1:
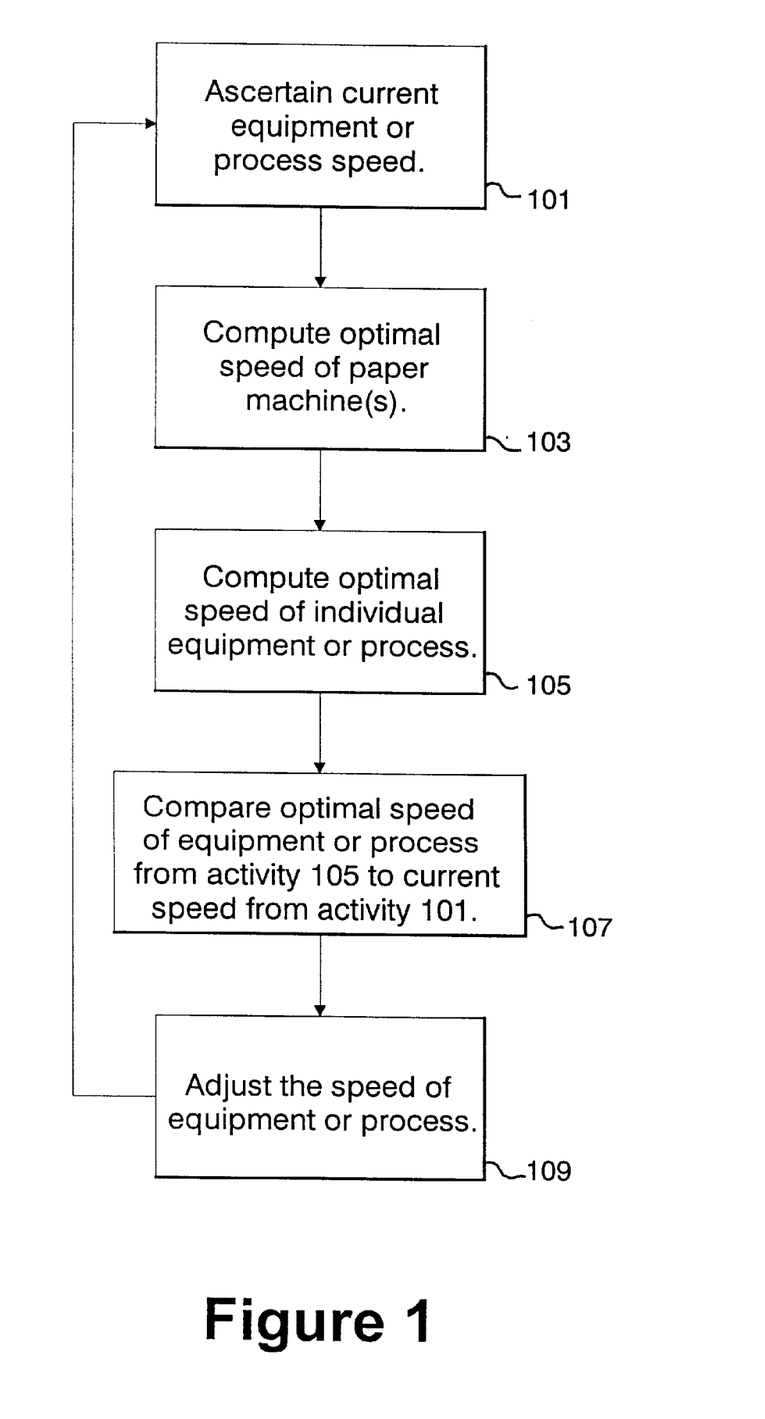
FIG. 1 is a block diagram of the inventive control system's activity of controlling the operating speed of equipment or process in a paper manufacturing facility.

FIG. 1 shows the use of a closed loop-control system version of the inventive control system. Block 101 represents the activity of ascertaining the current operating speed of a particular piece of equipment or process within the facility. Current speed data may also be used in accumulating historical speed data for a particular measured time period, which is then used to set an average speed for a particular time period (as discussed below). Block 103 represents the activity of determining the optimal operating speed of the paper machines. This activity is diagramed in more detail in FIG. 2.

Block 105 represents the activity of determining the optimal operating speed of a particular piece of equipment or processes from the output of block 103. This activity involves computing the appropriate operating speed of a particular piece of equipment or process to fulfill the requirements of the paper machines' running at the optimal operating speed (this may first require a determination of the operating speed of equipment groups or processes at a higher grouping level).

It is important to point out that at any given time period, equipment and processes can deviate from the optimal operating speed, and through a process of averaging can still fulfill the needs of the paper machine. For example, the inventive control system may determine that a pulp washer must operate at a speed of 1,000 feet per minute to achieve optimal operating speed. If the washer operates at 500 feet per minute for 12 hours and then at 1,500 feet per minute for 12 hours, its daily speed has been optimized. The inventive control system can, however, take into account in establishing the optimal operating speed that the washer may experience two different manufacturing inflow usage profiles by operating at different speeds during the day. Historical speed data (accumulated in block 101, as discussed above) may be used in determining current speed, so that a desired average speed is obtained.

Block 107 represents the activity of comparing the current speed of the equipment or process determined in block 101 to the optimal speed determined in block 105.

Block 109 represents the activity of adjusting the speed of the equipment or process in response to the comparison established in block 107. The arrow from block 109 back to block 101 represents the activity of repeating of the above-described procedures in the closed-loop process. The process may be continuously repeated, intermittently repeated, or used once. The order of the steps shown is only the preferred embodiment. Other embodiments include performing the steps in a different order.

As mentioned above, FIG. 1 illustrates a closed-loop system. An open-loop system would preferably include blocks 103, 105 and 109. No monitoring of current operating speed would occur in the open loop system. Rather, a determination of the paper machine optimal operating speed (block 103) is followed by the equipment or process optimal speed computations (block 105) which is followed by a change in machine or process speed to the optimal operating speed established in block 105 (block 109). Open-loop control may be particularly useful when machines in the facility have their own speed control.

FIG. 1 shows that the optimal operating speed is determined in an integrated fashion (i.e. including all relevant facility equipment) established before establishing the optimal operating speed for any individual equipment or processes. This integrated optimal operating speed is established before controlling any one piece of machinery or process because the preferred embodiment of the inventive control system involves an integrated calculation of the efficiency of the entire manufacturing process. Another alternative would be to establish the optimal operating speed of a single piece of equipment or process or groups of certain equipment or processes (for example, the paper machine alone) without establishing the optimal operating speed of all the relevant equipment in the entire facility.

Further, the above description utilized the paper machine (s) as the piece of equipment to serve as the measured optimal operating speed, since it is the focal point of production in the papermaking operation. While all machinery can likewise be speed controlled in the same manner, the paper machine operating speed will likely best dictate the operating speed of other equipment. Other equipment could be chosen, however, to establish the operating speed of all the facility's equipment.

Figure 2:
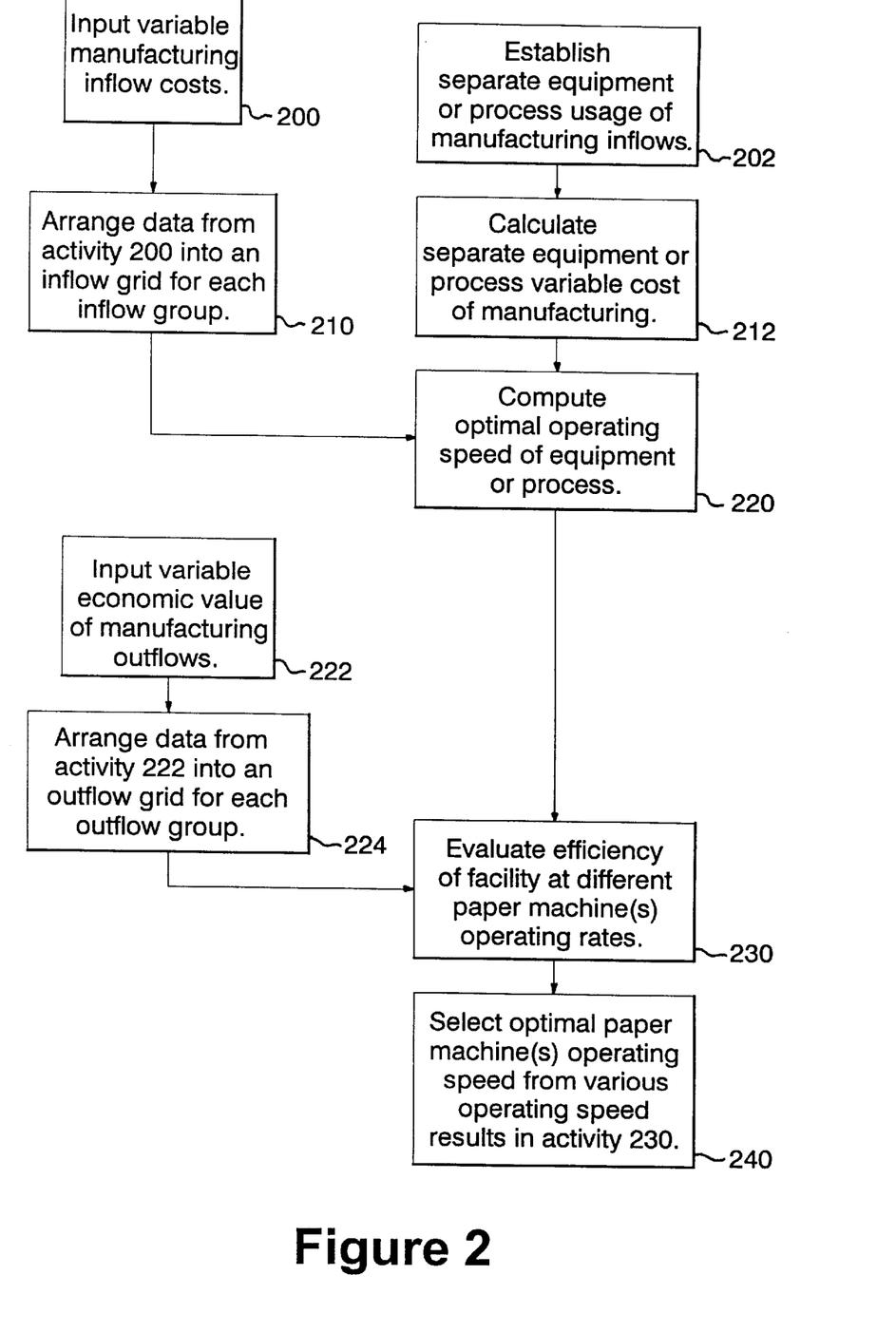
FIG. 2 is a block diagram that describes the activity of computing the optimal operating speed of a particular piece of equipment or process selected as the primary focal point. Other equipment or processes in a facility will have operating speed determined from the focus equipment or process. In this figure, the paper machine was selected.

FIG. 2 represents the sub-activity of determining the optimal operating speed of the paper machine (block 103 of FIG. 1). Block 200 represents the activity of inputting all the variable cost of manufacturing inflows. This may be done manually or electronically at the occurrence of the actual purchases. For example, when a purchase of wood is made by the purchasing department of a papermaking facility, either manual data on cost and quantity are entered or such data is automatically transferred from the computer system handling the purchase information.

Inputs may also be made on known price and quantity quotes rather than actually purchase transactions. This may be an effective means of gathering more real-time information. For example, quoted energy prices may be able to flow directly to the inventive control system to obtain current potential per-unit energy costs.

One purpose of inputting the quantity of each variable manufacturing inflow purchase is to establish the quantities of available resources. This will help determine the optimal operating speed based on the available resources. Further, information on quantity of purchases will aid in determining the variable usage of manufacturing inflow alternatives. For example, the inflow data may establish that pulp wood purchases can only be made to fulfill 75 % of the facility's potential operating speed. Additional operating speed will, therefore, have to be met through an alternative variable manufacturing inflow, such as purchased wood chips or market pulp. This may lead to less economic efficiency at higher operating speeds, which results in a lower optimal operating speed compared to a facility that can fulfill its pulp requirements internally.

The inputting of manufacturing inflows may also include the production of ancillary products needed in the manufacturing process. For example, steam generation is needed for many parts of paper manufacturing. Steam may, therefore, be considered a manufacturing inflow in which the per-unit cost of particular quantities of steam could be included as inputs in block 200.

An alternative to treating steam as a manufacturing inflow would be to treat its manufacture as part of the papermaking process of the facility. In this regard, steam generation would have its own variable manufacturing inflow needs. For example, fossil fuel (such as coal or natural gas) would be a manufacturing inflow to the production of steam and would, therefore, be a separate input at the activity in block 200.

Block 210 involves a computing or data organizing function of the inventive control system where the information from the variable manufacturing inflow inputs of block 200 is arranged by individual layers of inflows to be retrieved by later computations described below. The results of this activity will be the creation of a purchase grid.

A paper manufacturing facility, ideally, purchases its manufacturing inflow items in an increasing per-unit cost fashion based on operating speed. This means that the purchasing departments are securing manufacturing inflows with the lowest per-unit cost before investigating purchases of greater cost. Consequently, if the operations were curtailed, the highest per-unit cost raw materials would not be purchased. Under this arrangement, per-unit cost of inflows is directly correlated to increasing operating speed. More particularly, this would result in the use of a particular item of inflow with the highest per-unit cost to fulfill the last quantity needed by the facility to operate at full speed. Conversely, as speed decreases, less expensive per-unit inflows would be utilized. If this behavior exists or is desired, the purchase grid from the input data in activity block 200 would be layered in the block 210 activity in a fashion of increasing per-unit costs so that inflows are retrieved in a least-expensive-out-first fashion.

A simple example of this would be a facility that has two wood purchases: one purchase layer at $50 per-unit (such as a cord) that covers 75 percent of the potential operating speed and a second purchase layer at $85 per-unit that covers the remaining 25 percent of potential speed. In establishing the optimal speed (which will become apparent with the full description of this FIG. 2), the inventive control system would utilize the $50 purchase layer for potential operations up to 75 percent of the potential speed and the more expensive $85 purchase layer for potential operations that exceed 75 percent of the potential speed.

Data arranged in the activity of block 210 would likely be segregated for each category of variable manufacturing inflow. For example, the input for pulp wood purchases would be arranged in the above manner separately from market pulp purchases.

Facility operators will establish their own methodology of what purchase data will be input and how it will enter and exit the purchase grid. Current purchase orders, for example, can be an effective input for the purchase grid. As the orders are input, the activity of block 210 could add them to the purchase grid. The items would later be removed from the purchase grid at an established point in time decided by the operator. In general, the time of deletion from the purchase grid will be based on operator's decision of when the information no longer has relevance for determining optimal operating speeds. This removal could be performed manually or electronically from information systems that track purchases and flows of inventory.

Since the optimal operating speed is determined by marginal transactions, the operator may chose only to include those purchases above a certain operating speed. For example, an operator may not want to include low cost wood purchases that represent the first 50 % of operating speed because the operator knows that the facility could never be efficient below this speed.

Block 202 represents the activity of establishing the variable usage of manufacturing inflows for individual pieces of equipment or process. The result of this activity is to establish a correlation between the operating speed and the variable usage of manufacturing inflows for a relevant particular piece of facility equipment or process. The data used to establish the correlation would be input manually or electronically from historical data on operations at different operating speeds. It may also likely involve the creation of formulas or other data-solving methodologies, either electronically or manually, to establish the correlations based on the unique characteristics of the facility equipment and processes.

The activity represented in block 202 would be performed for each chosen relevant piece of equipment or process of the facility. The potential activities represented in block 202 are numerous. Some examples of equipment are: debarkers, chippers, digesters, grinders, pulp manufacturing refiners, pulp manufacturing refiners, screening equipment, washers, bleaching equipment, stock preparation refiners and chests, cleaners, paper machines, off-machine finishing equipment, roll wrapping and handling, and converting equipment.

A slightly more detailed example of the activity of block 202 would be for the establishment of the variable usage of manufacturing inflows for a paper machine. The usage of manufacturing inflows of a paper machine could include pulp, electricity, steam, water, chemicals, effluent treatment, paper machine felts, paper machine wires, to name a few. Historical data on prior operations could be gathered to correlate the operating speed of the paper machine to its usage of inflows. Physical observations can also establish the usage correlations.

Usage could be measured in relation to acceptable output from the particular piece of equipment. For example, if sheet breaks and unacceptable rolls of finished product increase as paper machine operating speed increases, a mathematical relationship to the equipment's increased pulp usage, measured by quantity of pulp required for a given level of acceptable finished product, can be ascertained.

Usage of different types of manufacturing inflows will occur at different speeds of equipment. For example, a paper machine speed increase will likely result in an increase in pulp usage. If the pulp operation of the facility is limited to only supplying 80 percent of the fiber requirements of the paper machine running at full speed, the manufacturing inflow usage of purchased market pulp will be required, whereas operations below 80 % may not dictate such usage. Purchased pulp would become a necessary inflow usage at levels above 80 %. Alternatively, purchased pulp could be assigned a cost of zero below 80 %. The optimal facility efficiency will dictate whether purchased pulp will become part of the manufacturing inflows for speeds below 80 %.

Block 212 represents the activity of establishing the variable manufacturing cost for individual equipment or process. This activity involves applying the manufacturing inflow cost from the purchase grid developed in the activity at block 210 to each piece of equipment's variable usage of manufacturing inflows established in block 202. As discussed above, items retrieved from the purchase grid will be done so in a specific order as established by the user of the inventive control system. One possibility, as discussed above, would be based on a lowest-cost-first priority. The results of the activity in block 212 will be to establish a correlation between potential equipment or process operating speeds and the cost of manufacturing.

Some manufacturing inflow items will be required of more than one piece of equipment or process. For example, electricity will be a manufacturing inflow item that would be needed throughout virtually every piece of evaluated equipment in the facility. It will, therefore, require additional computations or assumptions regarding the usage of this item at the individual equipment level. For example, an average of actual electricity costs could occur at this level of analysis.

Activity block 220 involves the process of solving for the optimal operating speed of individual equipment or process when joined with other equipment or processes to form larger processes or groups of equipment that can have their own measurable operating speeds. The activity in block 220 also involves computes the variable cost of manufacturing of the larger processes or groups of equipment.

For example, pulp digesters and bleaching equipment are separate pieces of equipment that can be analyzed in the activity at block 212. This equipment can, however, be grouped into larger categories of production or processes. For example, each separate piece of bleaching equipment can then be grouped together to be analyzed for various operating speeds of the entire bleaching process. Further, since part of the bleaching process involves delignification, it can be grouped with other equipment (such as the digesters) to establish the variable cost of manufacturing in the delignification process. This also shows that equipment can become part of more than one grouping (i.e. bleaching and delignification).

Two similar pieces of equipment performing the same function could also be grouped together. For example, two paper machines producing identical printing paper products could be grouped together to determine the combined optimal operating speed of the machines in the printing papermaking process. If other machines in the mill also make another type of paper, such as linerboard, they also can be aggregated with the printing paper machines to establish the optimal operating speed of all paper machines in the manufacturing process.

Block 222 of FIG. 2 represents the activity of inputting the variable economic value of manufacturing outflows. This activity would involve the inputting of the net per-unit sales price and quantity of finished product (such as paper, pulp, or converted paper) and by-product (such as steam, fertilizer filler, spent chemicals, or electricity) sold. Similar to the activity in block 200, inputting could be done manually or electronically through the facility's accounting or other information systems. It could include actual sales, market prices or some other form of sales data.

Block 224 represents a data arrangement activity for manufacturing outflows that is similar to the activity occurring in block 210 for manufacturing inflows. Block 224 arranges the variable economic value of manufacturing outflow data inputs of block 222 in a layered fashion based on per-unit price of sales, which is referred to as the outflow grid. In the ideal environment, a paper manufacturing facility would be able to show a direct inverse correlation between net per-unit sales price of outflows and operating speed. If this occurs, the operator would establish a system in activity block 224 to arrange the data from block 222 in layers of decreasing per-unit price. These layers could be utilized by later steps of the inventive control system (described below) in a fashion of the highest per-unit value down to the lowest per-value unit based on operating speed.

A simple example of the activity in block 224 would be for a facility that only has two sales: one sale that covers 75 percent of the potential operating speed of the paper machine is at a net per-unit sale of $500. The other sale that covers 25 percent of the potential operating speed of the machine has a $400 net per-unit sale price. In establishing the optimal speed, the inventive control system could assume that the $500 per-unit sales for operations would be made before the $400 per-unit sales (other assumptions could be made).

Like the purchase grid described-above, the outflow grid could be customized by the operator in a number of different ways, including the size of the grid and how it changes over time. Sales of a particular chosen time periods and dollar amounts could dictate its characteristics. See the discussion of activity block 210 above for a similar discussion.

Data relating to a variety of finished products and byproducts would be organized or layered separately for each product (including basis weight differences) or by product. For example, if a paper facility manufactures both brown linerboard and bleached linerboard, each product line's variable economic value of manufacturing outflows would be arranged separately.

Block 230 represents the activity of evaluating the efficiency of the facility at different possible paper machine operating speeds. To accomplish this task, the activity in block 230 represents the comparison of the variable cost of manufacturing (established in block 220) to the variable economic value of manufacturing outflows (block 224) at different paper machine operating speeds. As discussed above, block 224 provides the per-unit price layers of economic value of manufacturing outflows. As also discussed above, these layers could be arranged by decreasing prices, so that the highest marginal operating speed results in the lowest marginal per-unit sale.

The activity in block 230 of comparing the results in block 220 to the results in block 212 may be done at any desired number of different potential paper machine operating speeds. Each facility operator could determine the appropriate number of different operating speeds to investigate. As discussed above, the paper machine or paper machines are the chosen piece of equipment to analyze the facility efficiency at different equipment operating speeds because it can be considered the most significant representation of production equipment in the papermaking process. A facility operator may, however, chose any number of other equipment or processes as the measuring instrument.

The activity in block 240 represents a selection of the optimal operating speed from all the potential operating speed performances calculated in block 230. The activity in block 240 will be dependent on the operator's definition of optimal operating speed.

The desired optimal operating speed may be defined as the operating speed that produces products and byproducts with the greatest excess of variable manufacturing cost over the economic value of manufacturing outflows. This speed also represents the speed at which the largest positive numerical sum can be obtained from the product of subtracting the variable manufacturing cost from the economic value of manufacturing outflows. This numerical sum is referred to as the greatest economic efficiency. If this is the selected definition, then one possibility for the methodology of carrying out the activity of block 240 would be to select from the resulting potential operating speeds in block 230 the operating speed that has a facility performance that achieves the greatest economic efficiency.

As data changes, the inventive control system will establish new optimal operating speeds in the manner described in FIG. 2 and adjust the equipment speed to achieve the new optimal operating speed as described in FIG. 1. For example, if a new high per-unit cost wood purchase is input in activity 200, it may ultimately result in a paper machine operating speed of 3,000 feet per minute for a single machine facility. The activity in Block 101(using a closed-loop control system) may measure that the current machine operating speed is 3,100 feet per minute (based on a prior set optimal operating speed before the expensive wood purchase). The activity represented in block 107 would compare the operating speed determined in block 101 with the determined revised optimal operating speed result from the activity represented in block 105 (which for the paper machine, was already computed from activity 103). The activity represented in block 109 would be a 100-foot per minute downward adjustment of paper machine speed from 3,100 feet per minute to 3,000 feet per minute.

Figure 3:
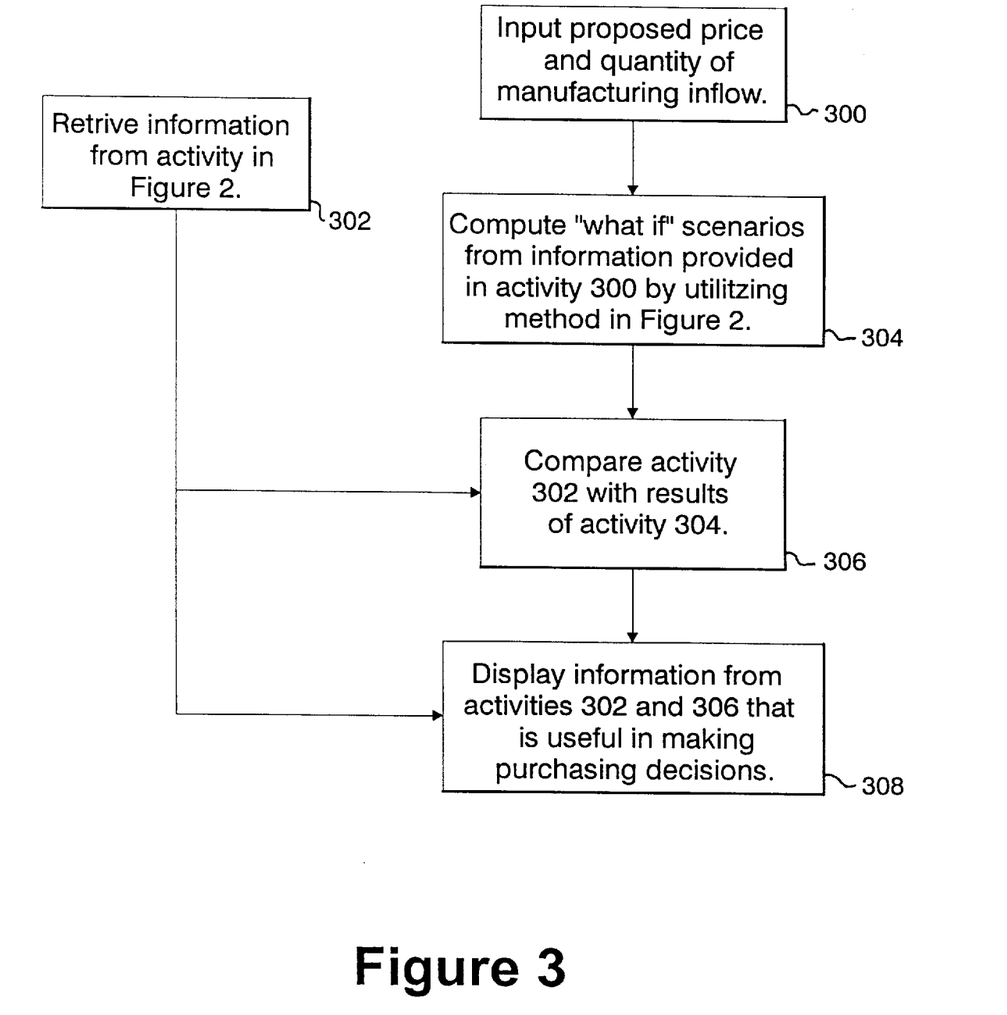
FIG. 3 is a block diagram that describes the activity of providing critical ancillary information relating to the marginal operating speed analysis.

As discussed above, another important feature of the inventive control system is that it will be able to provide ancillary information for its users. For example, personnel making manufacturing inflow purchase decisions or manufacturing outflow sales decisions could be provided with information regarding the effect of a potential purchase or sale. One possible piece of useful information is whether the proposed purchase or sale price of a transaction is efficient, and therefore, acceptable. The block diagram of FIG. 3 provides a methodology for providing ancillary information for a proposed purchase transaction. Although the methodology shown is for a purchase transaction, any business transaction or proposed transaction could employ a similar methodology. The Figure, therefore, is not meant to limit the scope of the method or apparatus of only providing ancillary information on purchase decisions.

Block 300 represents the activity of inputting information that contains the data to determine the per-unit price and quantity of a potential purchase transaction, such as a wood purchase for a papermaking facility.

Block 302 represents the activity of retrieving information from the activity in FIG. 2 relating to the current paper machine optimal operating speed calculations. Some examples of this information are: the current optimal speed, the current facility optimal economic efficiency, the current cost structure of the wood inventory (from its purchase grid), and the current selection of the highest wood cost being utilized from the wood purchase grid at the optimal paper machine operating speed.

Block 304 represents the activity of computing "what if" scenarios with the proposed purchase information input of block 300. The activity involves running operating scenarios under the methodology described in FIG. 2 as if the proposed purchase was actually made. This will provide information on the effect that the proposed purchase would have on the operation of the facility.

Block 306 represents the activity of comparing the data obtained from the "what if" scenarios created in the activity of block 304 with the current operations information obtained from block 302.

Block 308 represents the activity of displaying the information obtained from blocks 302, 304 and 306 for the purpose of providing useful information to aid in making the purchase decision. Examples of this information includes comparisons of current operations to "what if" scenarios for the purpose of showing the effect that the purchase has on optimal operating speed and efficiency, the effect that the purchase has on the average cost of wood utilized at the current optimal operating speed, information on the effect of the purchase on operating speed and economic efficiency based on different hypothetical wood purchase quantities at the proposed price. Other embodiments include using lookup tables, or solving equations based on marginal changes in one or more variables.

As mentioned above, a similar methodology could be followed for sales decisions. Further, similar methodology could also be employed to determine the effect on economic efficiency and operating speed for other decisions. These could include decisions on capital equipment additions, capital equipment deletions, proposed changes in the processes, or changes to other operating variables.

It is anticipated that the input activity of blocks 200 (purchasing inflows) and 202 (selling outflows) and the data input and output for the ancillary information could be accomplished at locations away from the manufacturing facility. For example, wood procurement personnel could enter a proposed purchase of a certain quantity and price of pulpwood (activity represented at block 300 of FIG. 3) into a personal computer, lap-top computer or other remote data input and retrieval device (including wireless) at a remote location, such as a forest where pulpwood is located. The device could relay the information back to devices at the facility for a computation of the effect that the proposed purchase would have on economic efficiency. This information would be instantaneously relayed back to the device for display (activity in block 308). Similarly, inputs of completed purchases (activity 200) or sales (activity 202) could be immediately input into the inventive control system from remote locations, such as customer locations.

While there are many methods of calculating the proper operating speeds based on the many operating variables in the process, the preferred way of carrying out the method of the invention will be through, at least in part, the use of a computer program that utilizes a digital or analog computer processing mechanism. Any or all of the activities associated with establishing an optimal operating speed can, however, be computed or implemented in other means including, but not limited to, manual computations, look up tables, analog control circuits and charts that will perform the calculations necessary to compute the appropriate operating speed of the facility or equipment. One skilled in this art will be able to write computer routines, design control circuitry, or create tables that implement the various steps described herein. The computer program may be run on a "stand alone" computer, to which data is manually inputted, or by a microprocessor that is part of a larger control system, and which receives data automatically from other parts of the control system. Likewise, the output may "stand alone" or be integrated into a larger control system.

Monitoring and adjusting the speed of the equipment or processes could, therefore, be performed manually from the data output of the inventive control system. It would, however, be preferred for several, if not most, pieces of equipment or processes in a papermaking facility to integrate the inventive control system's calculated operating speed directly to the control of the machine's operating speed by means of electronic connection to the equipment. For example, the paper machine controls could automatically slow the operating speed down to a new optimal operating speed if a change occurs to one or more variables in the entire papermaking process that dictates a slowing of the operating speed.

To establish the electronic connection to the equipment, inputs and outputs from the inventive control system could be integrated with other existing control or information systems in the facility. For example, existing controls of equipment could provide input on the variable usage of manufacturing inflows and also could implement the computed optimal operating speed established by the inventive control system. Similarly, accounting and other information systems could also provide cost information for the manufacturing inflows, the manufacturing inflow usage, and the economic value of manufacturing outflow information. Ancillary data computed by the inventive control system (discussed above) could also be integrated with the other systems to provide information to the operators and other departments in the facility.

Another possible embodiment of the inventive control system is that it could become a part of the overall machine control systems of equipment or processes and/or become a part of other information systems within the facility. For example, present machine controls, such as control systems on a paper machine could include the embodiment of the inventive control system.

Numerous modifications may be made to the present invention which still fall within the intended scope hereof. Thus, it should be apparent that there has been provided in accordance with the present invention a method and apparatus for the inventive control system that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A method of controlling the operating speed of a papermaking facility comprising the steps of:
   Determining a desired operating speed, the desired operating speed dependent on at least one economic variable that varies depending on the operating speed; and
   adjusting the operating speed in response to the determination.

2. The method of claim 1, further including the steps of:
   determining a current operating speed of the papermaking facility;
   comparing the current operating speed to the desired operating speed; and
   further adjusting the operating speed in response to the comparison.

3. The method of claim 2, wherein the at least one economic variable is at least one of: a cost of manufacturing, at least one manufacturing inflow, and at least one manufacturing outflow.

4. The method of claim 3, wherein the desired operating speed is determined by calculating the cost of manufacturing, the manufacturing inflow, and the manufacturing outflow at a plurality of potential operating speeds, and selecting the desired operating speed from the potential operating speeds.

5. The method of claim 3, wherein the desired operating speed is determined by calculating a marginal cost of manufacturing, a marginal manufacturing inflow, and a marginal manufacturing outflow at a plurality of marginal potential operating speeds and selecting the desired operating speed from the marginal potential operating speeds and a prior desired operating speed.

6. The method of claim 3, wherein the manufacturing outflow is determined by ascertaining a correlation between operating speed and sales of at least one of finished products and byproducts.

7. The method of claim 6, wherein the correlation between the operating speed and sales is ascertained by assigning a plurality of manufacturing outflows to at least one specific portion of the paper manufacturing facility's production.

8. The method of claim 6, wherein the manufacturing outflow is determined, from highest to lowest per-unit economic value, for increasing levels of the paper manufacturing facility's production.

9. The method of claim 1, wherein the economic variable is cost of manufacturing, and the cost of manufacturing includes ascertaining the correlation between operating speed and the cost of manufacturing.

10. The method of claim 9, wherein the cost of manufacturing is determined by ascertaining a correlation between operating speed and at least one of the following: the per-unit cost of manufacturing inflows and the usage of manufacturing inflows.

11. The method of claim 10, wherein the correlation between manufacturing cost and operating speed is ascertained by establishing the correlation between manufacturing costs and operating speed of specific equipment or process in a paper manufacturing facility.

12. The method of claim 10, wherein the correlation between manufacturing cost and the operating speed of a paper machine includes the manufacturing inflows during one or more of sheet breaks and production that produces finished product of unacceptable quality.

13. The method of claim 10, wherein the correlation between manufacturing cost and operating speed for a paper machine is determined by including usage of manufacturing inflows associated with paper breaks.

14. The method of claim 10, wherein the correlation between manufacturing cost and operating speed is ascertained by establishing the correlation between manufacturing costs and operating speed of groups of at least one of equipment and processes in a paper manufacturing facility.

15. The method of claim 14, wherein the purchase price of manufacturing inflows is assigned, from lowest to highest per-unit cost, to increasing levels of the paper manufacturing facility's production.

16. A papermaking facility operating speed controller comprising of:
   means for determining a current operating speed of the papermaking facility;
   means for determining a desired operating speed, the desired operating speed dependent on at least one economic variable that varies depending on the operating speed;
   means for comparing the current operating speed to the desired operating speed; and adjusting the current speed in response to the comparison.

17. The apparatus of claim 16, wherein the means for determining includes means for determining a desired operating speed to achieve an optimal operating speed from at least one of: a cost of manufacturing, at least one manufacturing inflow, and at least one manufacturing outflow.

18. The apparatus of claim 17, wherein the means for determining includes means for determining a desired operating speed by calculating the cost of manufacturing, the manufacturing inflow, and the manufacturing outflow at a plurality of potential operating speeds and selecting the desired operating speed from the potential operating speeds.

19. The apparatus of claim 17, wherein the means for determining include means for determining a desired operating speed by calculating a marginal cost of manufacturing, a marginal manufacturing inflow, and a marginal manufacturing outflow at a plurality of marginal potential operating speeds and selecting the desired operating speed from the marginal potential operating speeds.

20. The apparatus of claim 18, wherein the means for determining include means for determining a desired operating speed by ascertaining the correlation between operating speed and the cost of manufacturing.

21. The apparatus of claim 20, including means for determining the variable cost of manufacturing by ascertaining a correlation between operating speed and at least one of the following: the per-unit cost of manufacturing inflows and the usage of manufacturing inflows.

22. The apparatus of claim 19, further including means for determining manufacturing outflows by ascertaining a correlation between operating speed and sales of at least one of finished products and byproducts.

23. The apparatus of claim 22, wherein the means for ascertaining includes means for correlating the manufacturing outflows by assigning different economic values of manufacturing outflow with specific portions of the paper manufacturing facility's production.

24. The apparatus of claim 23, further includes means for determining the at least one of manufacturing outflows from highest to lowest per-unit economic value, to increasing levels of the paper manufacturing facility's production.

25. An article of manufacture comprising:
 a computer usable medium having computer readable program code embodied therein for determining a desired operating speed of a papermaking facility comprising;
 computer readable program code means for receiving as an economic input at least one economic variable that varies depending on the operating speed;
 computer readable program code means for determining the desired speed, the desired speed being dependent on the economic input; and
 computer readable program code means for outputting the optimal speed,
 said optimal speed being inputted into said papermaking facility in conjunction with a computer system.

26. The article of claim 25, further including:
 computer readable program code means for determining a current operating speed of the papermaking facility;
 computer readable program code means for comparing the current operating speed to the desired operating speed; and
 computer readable program code means for further adjusting the current speed in response to the comparison.

27. The article of claim 25, wherein the means for determining includes computer readable program code means for determining a desired operating speed from at least one of: cost of manufacturing, manufacturing inflows, and manufacturing outflows.

28. The article of claim 27, wherein the means for determining includes computer readable program code means for determining a desired operating speed by calculating the cost of manufacturing, the manufacturing inflow, and the manufacturing outflow at a plurality of potential operating speeds and selecting the desired operating speed from the potential operating speeds.

29. The article of claim 27, wherein the means for determining includes computer readable program code means for determining a desired operating speed by calculating a marginal cost of manufacturing, a marginal manufacturing inflow, and a marginal manufacturing outflow at a plurality of marginal potential operating speeds and selecting the desired operating speed from the marginal potential operating speeds that contribute to achieving an optimal operating speeds.

30. The article of claim 29, further including computer readable program code means for ascertaining a correlation between operating speed and sales of at least one of finished products and byproducts.

31. The article of claim 29, wherein the economic variable is cost of manufacturing, and further including computer readable program code means for ascertaining the correlation between operating speed and the cost of manufacturing.

32. The article of claim 31, further including computer readable program code means for ascertaining a correlation between operating speed and at least one of the following: the per-unit cost of manufacturing inflows and the usage of manufacturing inflows.

33. The article of claim 31, further including computer readable program code means for establishing the correlation between manufacturing costs and operating speed of specific equipment or process in a paper manufacturing facility.

34. The article of claim 31, further including computer readable program code means for correlating the manufacturing cost and the operating speed of a paper machine including the manufacturing inflows utilized during one or more of sheet breaks and to periods in which finished product of unacceptable quality is produced, measured by including such manufacturing inflows utilized with other manufacturing inflows utilized in the paper machine operation.

35. The article of claim 31, further including computer readable program code means for assigning different economic values of manufacturing outflows to specific portions of the paper manufacturing facility's production.

36. The article of claim 31, further including computer readable program code means for correlating the manufacturing cost and operating speed for a paper machine by including usage of manufacturing inflows associated with paper breaks and finished goods of unacceptable quality.

37. The article of claim 36, further including computer readable program code means for assigning the purchase price of manufacturing inflows from lowest to highest per-unit cost, to increasing levels of the paper manufacturing facility's production.

38. The article of claim 31, further including computer readable program code means for correlating the manufacturing cost and operating speed by establishing the correlation between manufacturing costs and operating speed of groups of equipment or processes in a paper manufacturing facility.

39. The article of claim 38, further including computer readable program code means for assigning the manufacturing outflow from highest to lowest per-unit economic value, to increasing levels of the paper manufacturing facility's production.

* * * * *